United States Patent [19]

Mohan et al.

[11] Patent Number: 5,280,611
[45] Date of Patent: Jan. 18, 1994

[54] METHOD FOR MANAGING DATABASE RECOVERY FROM FAILURE OF A SHARED STORE IN A SYSTEM INCLUDING A PLURALITY OF TRANSACTION-BASED SYSTEMS OF THE WRITE-AHEAD LOGGING TYPE

[75] Inventors: Chandrasekaran Mohan, San Jose; Inderpal S. Narang, Saratoga; James Z. Teng, San Jose, all of Calif.

[73] Assignee: International Business Machines Corporation, Armonk, N.Y.

[21] Appl. No.: 790,241

[22] Filed: Nov. 8, 1991

[51] Int. Cl.⁵ .............. G06F 11/30; G06F 12/16; G06F 15/40
[52] U.S. Cl. .............. 395/600; 371/12; 364/DIG. 1; 364/267.1; 364/282.1; 364/285.2
[58] Field of Search .............. 395/600, 575; 371/7, 371/12, 14, 16.5, 29.1; 364/DIG. 1 MS File

[56] References Cited

U.S. PATENT DOCUMENTS

| | | | |
|---|---|---|---|
| 4,480,304 | 10/1984 | Carr et al. | 364/200 |
| 4,945,474 | 7/1990 | Elliott et al. | 395/600 X |
| 5,043,866 | 8/1991 | Myre, Jr. et al. | 395/600 |
| 5,170,480 | 12/1992 | Mohan et al. | 395/600 |

OTHER PUBLICATIONS

Research Disclosure, May 1986, No. 265, Kenneth Mason Publications Ltd., England, Improved Write-Ahead Logging.
Research Report, RJ 6649, Aries: A Transaction Recovery Method Supporting Fine-Granularity Locking and Partial Rollbacks Using Write-Ahead Logging, Co. Mohan, pp. 1-58.
Distributed Data Bases, Bruce G. Lindsay, "Single and Multi-Site Recovery Facilities", pp. 261-265.
Data Recovery in IBM Database 2, R. A. Crus, IBM Systems Journal, vol. 23, No. 2, 1984, pp. 178-188.
Journal of Systems Management, Information Access Company; Association for Systems Management 1990, vol. 41, No. 1, p. 33, Current Trends in Transaction Processing Systems, Kumar, Vijay.

*Primary Examiner*—Thomas M. Heckler
*Attorney, Agent, or Firm*—Baker, Maxham, Jester & Meador

[57] ABSTRACT

In a multi-system data sharing complex, a database system can write updated pages to a shared electronic store for a fast write. Other database systems can obtain pages written to the shared store for further modification without the pages first being written to stable storage. However, pages are eventually written to the stable storage in a castout process. Recovery of a database from failure of the shared store is bounded by determination of a recovery boundary which, when applied to the union of database system transaction logs, establishes a point in front of which are found log records of modifications to pages which were in the shared store when it failed. These log records are applied to page versions obtained from stable storage to recover from failure of the shared store.

11 Claims, 5 Drawing Sheets

METHOD FOR MANAGING DATABASE RECOVERY FROM FAILURE OF A SHARED STORE IN A SYSTEM INCLUDING A PLURALITY OF TRANSACTION-BASED SYSTEMS OF THE WRITE-AHEAD LOGGING TYPE

BACKGROUND OF THE INVENTION

The technical field of this invention covers the recovery of transaction-based database systems of the write-ahead logging type to a consistent state following a failure. This method is practiced in a multi-system environment in which a plurality of independently-executing database systems share an electronic store for caching data obtained from stable direct access storage. The database systems are all transaction-based and use a transaction log according to a write-ahead protocol.

The background of the invention is exemplified by:
1. Haderle et al, U.S. patent application Ser. No. 07/406,186, "METHOD FOR MANAGING SUBPAGE CONCURRENCY CONTROL AND PARTIAL TRANSACTION ROLLBACK IN A TRANSACTION-ORIENTED SYSTEM OF THE WRITE-AHEAD LOGGING TYPE", filed Sep. 7, 1989, abandoned;
2. Mohan et al, "ARIES: A TRANSACTION RECOVERY METHOD SUPPORTING FINE-GRANULARITY LOCKING AND PARTIAL ROLLBACKS USING WRITE-AHEAD LOGGING", IBM Research Report RJ 6649;
3. Mohan et al, U.S. patent application Ser. No. 07/627,315, "NON-BLOCKING SERIALIZATION FOR REMOVING DATA FROM A SHARED CACHE", filed Dec. 14, 1990;
4. Lindsay, "Single and Multi-Site Recovery Facilities" in DISTRIBUTED DATABASES, Draffan et al Eds, Cambridge University Press, 1980.
5. R. A. Crus, "Data Recovery in IBM Database 2", IBM Systems Journal, Vol. 23, No. 2, 1984

In the prior art, transaction-oriented database systems which employ a write-ahead protocol in maintaining logs for recovery in system restart and database recovery from media failure have been fully described. Of the above references, the Haderle application and the IBM Research Report both disclose a write-ahead logging system in which log records are assigned monotonically-increasing log sequence numbers and set forth a method for bounding recovery operations after system failure or media failure where database resides by means of a selected log sequence number. The Lindsay reference describes log-based recovery. The Mohan et al patent application discusses a multi-system data sharing environment in which a plurality of independently-executing database systems utilize a shared storage for caching data for efficient inter-system access and for staging updated data back to permanent storage. Crus discloses a data recovery technique which accommodates transactions that are ongoing when a failure affecting the database occurs.

Transaction-based database system management is well-known and can be understood with reference to available literature such as Date's "An Introduction to Database Systems", Addison Wesley Publishing Company, 1986. Essentially, a transaction-based database management system utilizes a system log stored on stable storage in which are recorded the steps of executing transactions in transforming a consistent state of a recoverable data resource into another consistent state. The transaction steps which are logged can reflect use or modification of a data resource. Logged actions which reflect modification of a data resource form the basis for reconstruction ("recovery") of data. Multi-phase transaction processing initiates a transaction with a BEGIN operation and ends with either a COMMIT or an ABORT operation. The COMMIT operation signifies that a new point of consistency has been reached and all updates made by the transaction must be made permanent. The ABORT operation means that a fault has occurred and that changes made up to the ABORT point must be undone ("rolled back").

Write-ahead logging is a protocol requiring the entry into the log of transaction log records representing changes to a data structure before the changed data structure can replace a previous version of the data structure in permanent storage.

The recordation of transaction progress in a transaction log is essentially in the form of a sequence of records. Every log record has a unique location in the sequence. Sequence locations can be uniquely identified by log sequence numbers (LSN's) which are assigned in a monotonically changing sequence. A convenient way of assigning LSN's is to utilize "timestamps" which are essentially measurements of elapsed time from some initial point. Thus, a microsecond/millisecond/second-/minute/hour/date clock can provide log sequence numbers in the form of timestamps.

Failures may occur which catastrophically interrupt or prevent access to a database. In these circumstances, the data must be "recovered" to a "consistent" state. Transaction log records are used for this purpose since they reflect all changes made to data and the status of all transactions operating on data at the time of failure. The transaction log records contain information which is applied to the database to recover it to a consistent state. The challenge in the prior art has been to bound the amount of recovery work which is necessary to bring a database to a consistent state.

Several techniques are described in the prior art which utilize a log sequence number to establish a recovery boundary. These techniques involve ways of "moving" the boundary forward in order to minimize the amount of recovery work required. Since data versions are continually being swapped in a database system between working storage and stable storage, the boundary log sequence number is moved forward to the point in the transaction log behind which the changes made by transactions are in the stable storage. From the boundary forward are found the log records whose changes may not yet be entered in stable storage. The prior art shows how the buffer manager of a database management system (DBMS) maintains and moves the boundary LSN.

Periodically, a DBMS will execute a checkpoint procedure to support restart in the event of failure. The checkpoint procedure is recorded in the transaction log in the same manner as the operations of a transaction. Checkpoint log records include the current boundary LSN, transactions which were active at the time the checkpoint was taken, pages which were "dirty" at the checkpoint, exclusive locks held by current transactions, and so on.

In the event of failure, a restart procedure is invoked in order to restart the failed system. The restart procedure receives the stable storage address of a control block which includes an index to the first record of the last checkpoint recorded in the transaction log. The checkpoint records are used to identify the data structures which must be recovered to a consistent state and the log records necessary for this recovery. The boundary LSN is a key element.

In the event of a failure of storage media, the "ARIES" reference of Mohan et al teaches at p. 32, et seq., that recovery may be bounded by a media recovery redo point. An image of a recoverable entity is loaded and a redo scan is initiated starting from the media recovery redo point. This recovery point is moved forward when an image of the recoverable entity is copied into permanent storage.

The restart and recovery procedures of the prior art which are based on transaction-oriented systems of the write-ahead logging type guarantee the fast, efficient, and reliable operation of a database system. To date, however, these protocols have been developed for single-system use.

Recently, a multi-system data sharing architecture has been proposed in which multiple independently-executing DBMS's utilize a shared electronic store for trans-system data caching. The following U.S. patent applications address, respectively, a non-blocking process for bringing data into the shared store for stable storage and a non-blocking process for returning data from the shared store to the stable storage:

U.S. patent application Ser. No. 07/628,211, filed Dec. 14, 1990;

U.S. patent application Ser. No. 07/627,315, filed Dec. 14, 1990

In this multi-system architecture, the shared store possesses a high degree of intelligence in the form of management logic which, among other things, manages storage of, and access to, data in the shared store. It is asserted that restart/recovery capacity may be included in the management logic. The management logic also has the ability to take and record checkpoints. However, it is contemplated that the shared store function only as a cache. In this regard, data is brought from stable storage to the shared store by way of a DBMS. However, data is accessed and modified by transactions locally in the buffers of the DBMS's. Modified data is cached in the shared store for fast access by the DBMS's, and data is returned to stable storage only by staging it through the shared store. Thus, no data is modified in the shared store, implying great simplification of the transaction and logging process in the shared store's management logic.

In the face of failure of the shared store, the challenge is to efficiently and quickly recover data which is in the store at the time of failure by bounding the recovery. Since the management logic of the shared store does not serve transactions, it currently has no means for maintaining a recovery boundary for the shared store. In the prior art, recovery of data from media failure can be performed by using an image copy (or dump) of a database and a transaction log. When a failure occurs, the image copy is entered into a replacement medium and the log records are applied. However, this process is slow because the image copy of database can be days/weeks old and the amount of log scan would be worth days/weeks.

SUMMARY OF THE INVENTION

It is, accordingly, an object of this invention to devise a method for efficiently recovering data from failure of a shared store in a multi-computer data sharing system including the shared store, stable data storage, and a plurality of independently-executing, transaction-oriented database systems of the write-ahead logging type which are connected to the stable storage and to the shared store and which use the shared store for trans-system data caching. It is a related object to put forward a method that utilizes the transaction log data of the individual DBMS's to bound recovery of data in the shared store.

These objects are satisfied by a method in which:
each database system ascertains a system sequence value which is substantially equivalent to the log sequence location of a log record recording the earliest modification to a data structure at the database system which is not included in any data structure in the shared store;

database system, for each data structure modified at the database system, providing sequence values which are substantially equal to log sequence locations of log records recording modifications to the data structure;

for each data structure in the shared store, based upon sequence values provided by the database systems, ascertaining a structure sequence value corresponding to a log sequence location of a log record of the earliest modification of the data structure occurring after the data structure was obtained from stable storage; and ascertaining from the system and data structure sequence values a recovery boundary for the shared store which corresponds to the earliest of the system and structure sequence values.

In a multi-computer data sharing system including a shared, high-speed electronic store (SS), a low-speed direct access data storage facility (DAS), a plurality of computer-implemented database systems connected to the SS and the DAS, and a database including data structures stored in the DAS, the invention contemplates that each database system includes transaction-based intelligence for:

obtaining data structures from the DAS;
locally storing data structures for immediate access;
altering locally-stored data structures; and
storing data structures in, and moving data structures from, the SS;

for recovery of the database from a failure of the SS, the method:

maintains for each database system a transaction log including a sequence of log records, each log record including a unique sequence value denoting its place in the sequence;

maintains at each database system a system sequence value which is substantially equal to the sequence value of a log record of the earliest modification made by the database system to locally-stored data structures which is not included in any version of the data structure stored in the SS;

maintains for each data structure modified and then stored in the SS, a structure sequence value corresponding to a log record of the earliest modification made by a database system to the data structure after the data structure was obtained from the DAS;

periodically determines a recovery sequence value by taking from the system sequence values and the structure sequence values, the sequence value which corresponds to a log record of the earliest modification made to any data structure which is locally stored at a database system or in the SS; and in the event of failure of the SS:

merges all of the transaction logs and, from the merged logs, identifies database structures in the DAS for which corresponding log records exist with sequence values following the recovery sequence value; and applies to the identified data structures the modifications in the log records with sequence values following the recovery sequence value.

DETAILED DESCRIPTION OF THE PREFERRED EMBODIMENT

Figure 1:
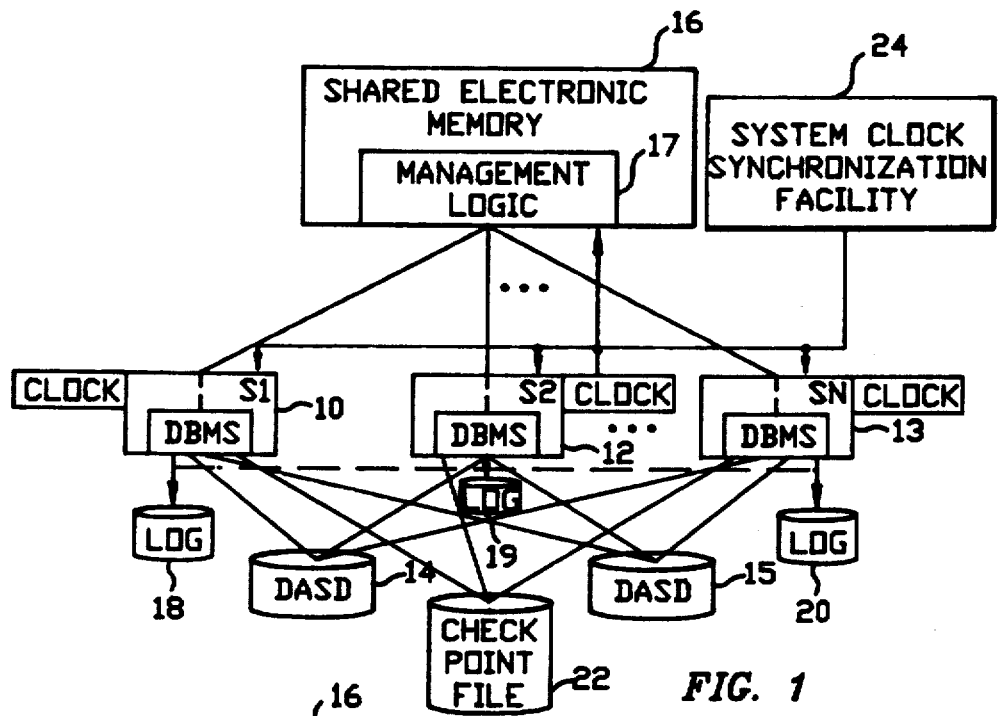
FIG. 1 depicts a multi-system environment in which the invention is practiced.

The invention operates in a multi-system environment which is illustrated in FIG. 1. In the multi-system environment of FIG. 1, each processor of a plurality of processors 10, 12, 13 executes a database management system (DBMS), independently of the others. A database consisting of data structures corresponding to a desired unit of storage and transfer is stored in stable storage consisting of, for example, direct access storage devices (DASD) 14 and 15. Hereinafter, the direct access storage devices are referred to as a direct access storage facility (DAS), while the unit of transfer and storage is assumed to be a page. A shared store (SS) 16 includes a shared electronic memory which is managed by management logic 17. In FIG. 1, the SS 16 consists of an electronic memory. The SS 16 can also be non-volatile electronic storage.

Each of the database management systems has an independent connection to the SS 16 and to each component of the direct access storage facility (DAS).

Each of the independently-executing DBMS's is preferably a transaction-oriented system of the write-ahead logging type. For each DBMS instance, the write-ahead logging protocol is supported on a respective one of stable storage logs 18, 19, and 20. A stable storage logging resource 22 is also provided for DBMS to record SS checkpoints.

Each of the processors 10, 12, 13 includes a clock component. The multi-system environment of FIG. 1 includes a system clock synchronization facility 24 so that each processor clock can provide a continuous, monotonically increasing sequence of timestamps. Such a clock synchronization facility is available for IBM ES/900 computers and is called IBM SYSPLEX TIMER 9037. Thus, during recovery of data after a failure of the SS 16, the log records in the union of all transaction logs 18, 19, and 20 will be in a time-ordered sequence across all of the DBMS's. In this regard, the transaction log records in each of the transaction logs 18, 19, and 20 are in a sequence which is indexed by an elapsed time, with the unit of indexation into a sequence being a log sequence number (LSN) in the form of a timestamp.

In the multi-system environment illustrated in FIG. 1, the read and write I/O times to the SS 16 are orders of magnitude better than those of the DAS devices 14, 15. Assuming that the DAS devices are disks, any one of the DBMS's can read a page from a disk into a local buffer which it alone controls, modify the page, and write it to the SS 16. The modified page is written to the SS because the write can be accomplished in significantly less time than a write to one of the disks 15, 16. The SS 16 provides efficient coherency for modified pages in a multi-system environment since any other system can read the most recent version of these pages from the SS 16. Preferably, the SS 16 is a store-in cache rather than a store-through cache. Relatedly, in a store-in cache, an updated page is not written to DAS when written to the SS 16. The most recent version of a page, therefore, exists in the SS 16 if there is a cache hit. The DAS components are not attached to SS 16. The logic in one or more of the database systems includes a component responsible for copying changed pages in the SS 16 to the DAS. In fact, the inventors contemplate that, once the page is obtained from the DAS by a DBMS and modified, it can only be returned to the DAS by being staged through the SS 16

Management policy for the SS 16 requires continuously monitoring the storage contents and sending back to DAS pages which are old, in order to make room for new pages. This is referred to as "casting out". Since the DAS is not attached to the SS 16, the control mechanization for casting out pages resides in the DBMS's. In the meantime, once brought in from DAS through a DBMS, a page may stay in the SS 16 for some time. A page may be changed several time by the same DBMS or by different DBMS's before it is cast out to DAS. The above-referenced U.S. patent application 627,315 teaches a non-blocking serialization method for casting out data from the SS 16.

In the preceding discussion, and in the discussion to follow, it is assumed that the unit of transfer and storage in the database system is a page. In fact, the inventors contemplate that the environment of FIG. 1 can utilize any appropriate data structure for its unit of transfer and storage.

Figure 2:
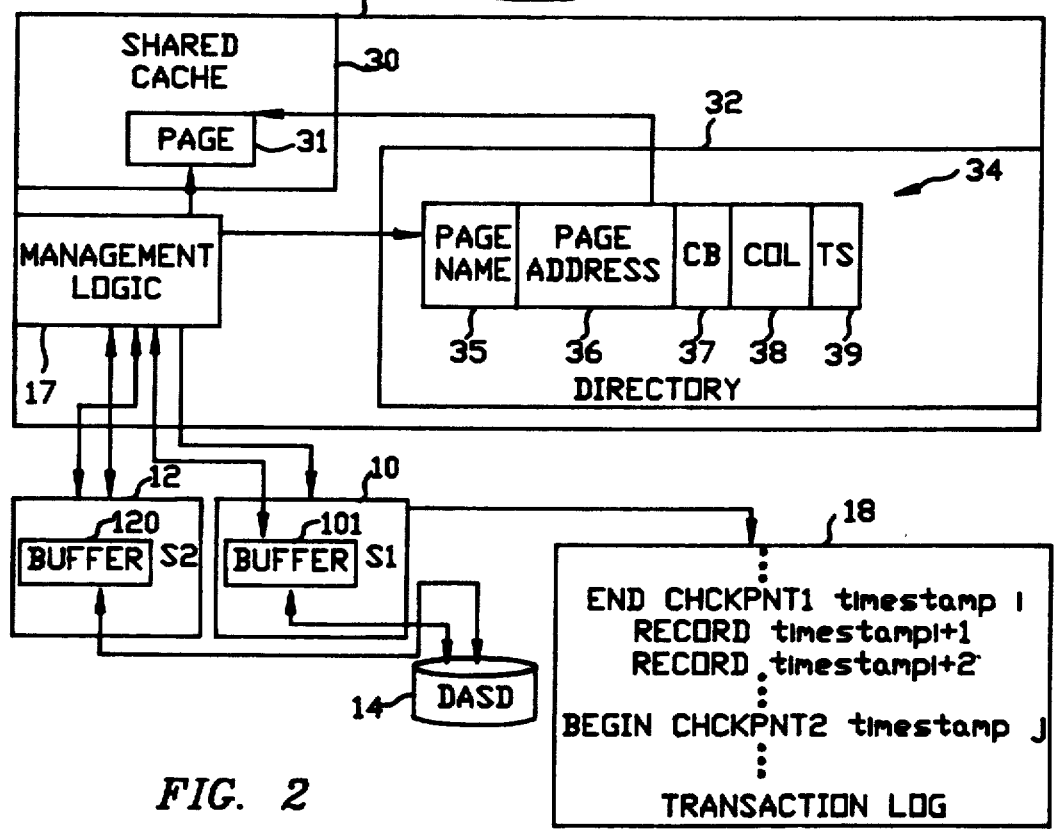
FIG. 2 depicts, in greater detail, structural features of the environment of FIG. 1 which are necessary to the practice of the invention.

FIG. 2 illustrates, in further detail, certain structural features which are necessary for an understanding of the invention. In particular, the SS 16 has addressable electronic memory resources forming a shared cache 30 in which pages are stored. One such page is indicated by reference numeral 31. The management logic 17 maintains a directory 32 having a plurality of entries. One such entry is indicated by reference numeral 34. The entry 34 is a multi-field control data structure containing control information required to manage the storage of data in the shared cache 30. For this invention, indexation to the entries of the directory 32 is by way of a page name which uniquely identifies a respective page which may be currently stored in, or which may have previously been stored in the shared cache 30. For the entry 34, the page name field is indicated by reference numeral 35. Other fields in the entry 34 include one for a page address 36 pointing to the shared cache address location where the page 31 is stored, a change bit (CB)

field 37, a castout lock (COL) field 38, and a timestamp (TS) field 39.

As FIG. 2 illustrates, each of the independently-executing systems in the processors 10 and 12 includes a local buffer 101 and 120, respectively, for storage of database data under the control of the respective database system. Although not shown, it is asserted that the database systems serialize updates to pages by a distributed lock management protocol. When making an update to a page, the database system writes a log record for the update. The log records are given log sequence numbers (LSN's) by applying to them timestamps supplied by the processor clock. In this regard, the transaction log for the DBMS in processor 10 is shown in greater detail. The sequence of log records in the log 18 includes a portion beginning with an END_CHECKPOINT record to which timestamp$_i$ is applied. Following are a sequence of transaction records beginning with the record bearing timestamp$_{i+1}$. A BEGIN_CHECKPOINT record has timestamp$_j$.

The management logic 17 of the SS 16 is required essentially to manage the storage and retrieval of pages in the shared cache 30. Note that pages are not modified in the shared cache 30, but are stored there for efficient access by DMBS's in the illustrated data sharing configuration.

THE INVENTION

In the invention, any database affected by the failure of the SS 16 can be recovered by using the DAS version of the database and by applying to the DAS version the merged sequence of log records in the union of transaction logs of all DBMS's using the database. By using the DAS version of the database as the base for recovery, the recovery time would be considerably reduced compared to, for example, the recovery time based on use of a previously dumped copy of the database. This is because the number of log records would be considerably smaller, thereby reducing the number of read I/O's for the log data and because the number of pages to which log records are applied would be smaller, reducing the number of read and write I/O's for the pages. Additionally, the log data which is scanned would be typically found in the active transaction logs. These logs are more likely to reside on one of the DASD devices (in contrast to archive logs, which could reside on tape).

Refer now to Tables 1-6 and to FIGS. 3-8 for an understanding of the operation of the invention in the described environment. In the following description, the DBMS's are considered to be distinct systems and are referred to as S1, S2, ... SN which execute, respectively, in processor 10, processor 12, ... processor 13.

Figure 3:
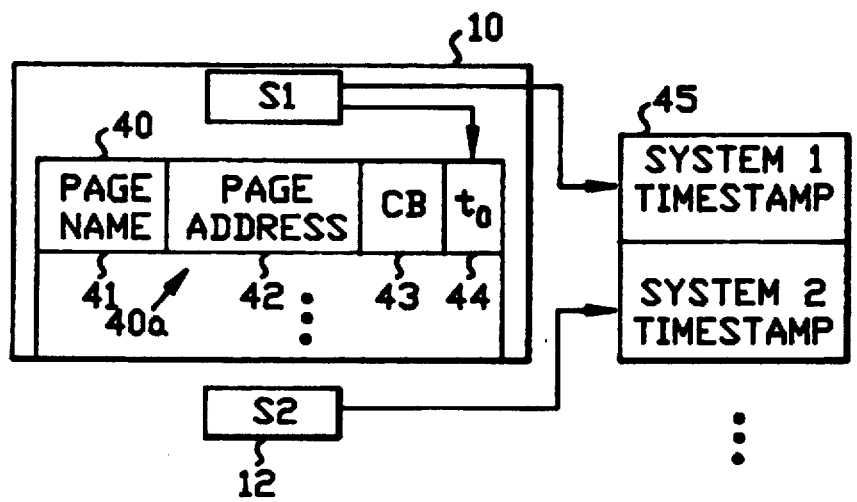
FIG. 3 illustrates the accumulation of system sequence numbers.

In FIG. 3, system S1 in processor 10 maintains a structure 40 listing the pages locally stored at its buffer 101. The structure 40 includes a plurality of entries, one such entry being indicated by reference numeral 40a. Each entry contains a page name field 41 for naming a page in the local buffer, a page address field 42 containing a pointer to the starting address of the page, and change bit (CB) and timestamp ($t_0$) fields 43 and 44, respectively. The structure 40 exists in the form of a "dirty page" list in which are listed pages in S1's local buffer which have been modified to a version which has not yet been externalized to the SS 16. For each dirty page, the timestamp field 44 contains a timestamp value $t_0$ corresponding to the timestamp of the transaction log record for the first modification to the page made at system S1 when the page state changes from "clean" to "dirty". The page state is considered clean by DBMS as long as the page in the buffer is the same as in DAS or SS 16. Thus, the value in the timestamp field 44 represents a transaction log sequence value preceding which there are no transaction log records of modification to the page since it was last obtained from the SS or DAS when SS did not have the page. From the timestamp fields in the dirty pages list, the DBMS S1 computes a "system_timestamp". This process is illustrated in Table 1, and is triggered in response to a recurring event, such as the DBMS checkpoint. Assuming that the process is so triggered, then, during the DBMS checkpoint, the dirty pages list 40 is set to the smallest timestamp in the dirty pages list. Thus, the system_timestamp value is the earliest-occurring timestamp of log records in the DMBS's transaction log for any updates in its buffer which have not yet been externalized to the SS16. When computing a new system timestamp value, the current value is valid until replaced by the new value. Table 1 (and Tables 2-6) is a pseudo-code listing which is reducable, using known techniques to a source code in any one of a number of computer languages. Such source code is executable on a digital computer.

The preferred embodiment of the system-timestamp computation is illustrated in Table 1. The process of Table 1 is initialized in step 101 to the last BEGIN_CHECKPOINT log record timestamp written to the transaction log before the process of Table 1 was triggered. Steps 102-105 essentially select the minimum value from the group including the timestamps in the dirty pages list and the BEGIN_CHECKPOINT timestamp, which is assigned in step 107 as the system timestamp value for system S1. The procedure is executed in a DBMS during each checkpoint, which ensures that the calculated value is moved forward periodically.

FIG. 3 illustrates a list 45 of system timestamps. Each member of the list corresponds to the system timestamp value of a respective DBMS and is updated by its corresponding DBMS at each checkpoint of the DBMS as illustrated in Table 1.

In Table 2, psuedo-code is presented for setting the timestamp value for a page and selecting the first such value for entry into the timestamp field $t_0$ in the dirty pages list entry for the particular page. Table 2 presumes that a DBMS responds to one of its locally-executing transactions by retrieving a page P which is to be modified locally at the DBMS. Step 201 ensures that a transaction-level lock is acquired by the requesting transaction in order to serialize its update with other updates performed at the DBMS. In step 203, an exclusive inter-system lock is acquired on the page to serialize DBMS access to it. Step 203 ensures that the locally stored (buffered) page is valid. In a multi-system data sharing environment, a locally cached copy of a page can be "invalid" if it does not contain latest updates made by another system. By retrieving the latest copy of the page, the local copy of the page is made "valid". In the prior art, there are several mechanisms for one system to invalidate copies which are locally cached in other systems when the page is updated by the system. See, for example, Carr et al "METHOD AND MEANS FOR THE RETENTION OF LOCKS ACROSS SYSTEM, SUBSYSTEM AND COMMUNICATION FAILURES IN A MULTI-PROCESSOR, MULTI-PROGRAMMING, SHARED DATA ENVIRONMENT", U.S. Pat. No. 4,480,304, issued on Oct. 30, 1984. Following modification of the page by the transaction, the modification history is recorded in the log at step 204 with the timestamp in the log record. In this regard, the page-timestamp which corresponds to the timestamp of the log record which describes the latest update to the page is modified. This timestamp is needed for performing recovery as described in U.S. patent application Ser. No. 406,186, referenced above. In step 205, if the page P were clean, its CB field would be reset. In this case, the CB field is set (changing the page P from a clean to a dirty state with respect to the SS 16) and the timestamp of the first log record for the modifying operation is entered into the t₀ field for the page. Otherwise, in step 207, if the page were dirty (indicated by the CB field being set), no action is taken with respect to the page's entry on the dirty pages list because an earlier timestamp value was already set for the page. Following the setting of the page-timestamp value, the page is freed by release of the intra-system latch (step 208). After the page is "cleaned" with respect to the SS16, the inter-system lock is released in step 209.

Figure 4:
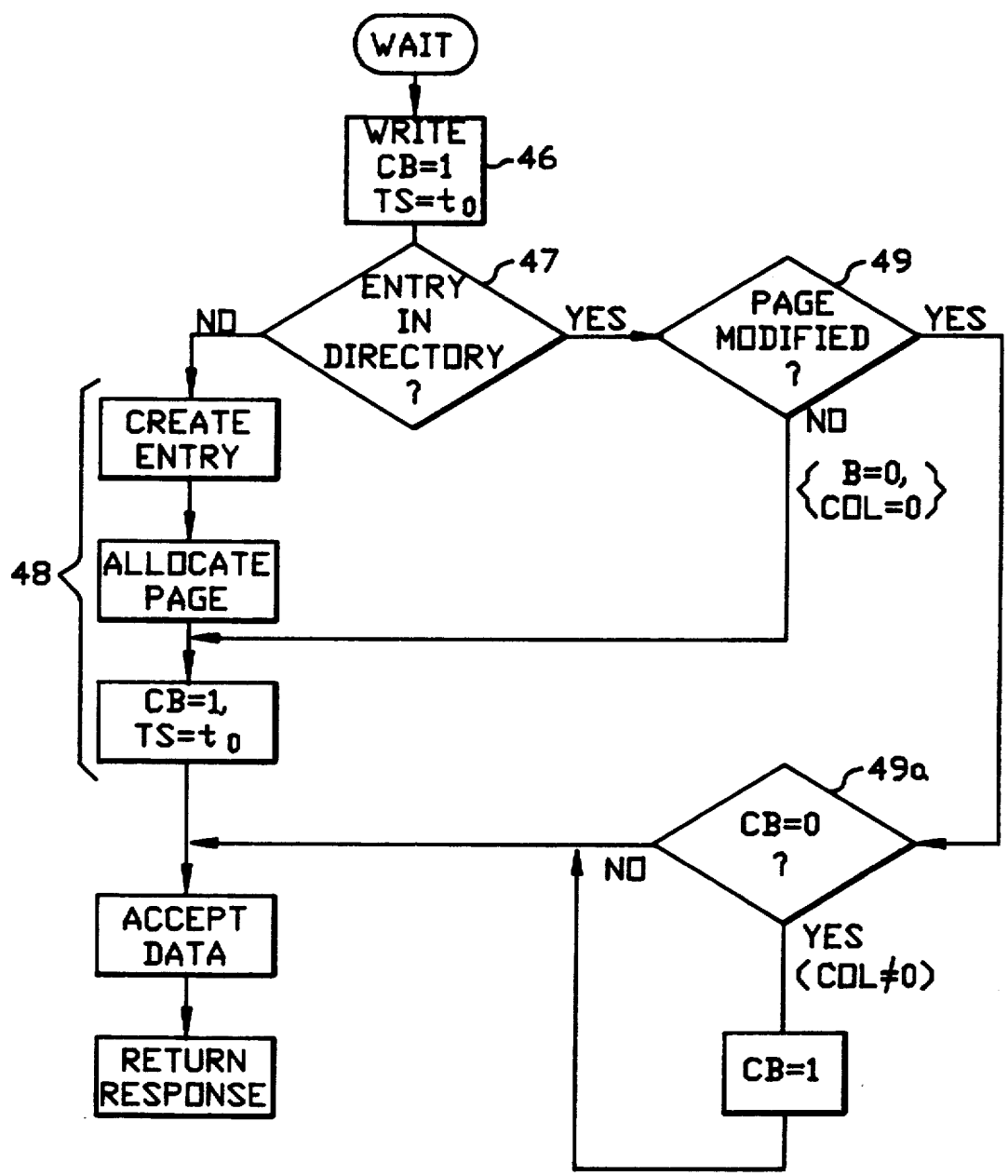
FIG. 4 is a flow diagram illustrating how the shared store maintains structure sequence values for data stored in it.

The logic of Table 2 is executed when a page is modified, but before the page is written to the SS 16. Table 3 contains an illustrative pseudo-code implementation of a procedure for writing a modified page to the SS and for transferring with it the value in the timestamp field of its dirty pages list entry. For convenience, the procedure of Table 3 is also illustrated in FIG. 4 in flow chart form. Underpinning the procedure of Table 3 and FIG. 4 is an operation for writing a page from a local buffer to the SS 16. This is termed a "page write" operation whose parameter list includes page name (P), the page's CB field value, the address in the local store (buffer address) where the page is located, and a timestamp parameter (TS) set to the value in the timestamp field of the page's dirty page list entry.

To begin the page write process, the requesting DBMS sets the command parameters to values found in the dirty pages list for the page. Assuming that the page has been modified at the DBMS, the CB (change bit) parameter is set (assuming that it is a single-bit value) and the value in the t₀ field is copied for TS. This corresponds to step 46 in FIG. 4. Step 47 onward at SS16 corresponds to Table 3 and represents action taken by management logic in the SS 16.

Upon receiving the page write request and associated parameter list from a DBMS, the SS directory 32 is searched for an entry corresponding to the page identified by the P parameter value. If no such entry exists, then, in steps 302-307, an entry is initialized, its CB value is set, and its TS field is set to the value of the corresponding page write parameter. This is illustrated in FIG. 4 in the sub-sequence 48. Following creation of the directory entry, the page write command is executed and the page is written to the SS 16.

Assuming, upon receipt of the page write request that a directory entry for P does exist, the positive exit is taken from the decision 47 in FIG. 4 and the directory entry for page P is inspected to determine whether the page has already been marked as dirty. In this regard, the outcome of the decision 49 in FIG. 4 depends on the conjunction of the CB and COL fields. If the CB field is reset and the COL field is set to 0 the CB and TS fields of the entry are conditioned to the values passed in the page write parameter list. However, if either the CB field is set or the COL field is non-zero, the page is considered dirty and the TS field of the SS directory entry is not changed. In steps 318 and 319 of Table 3, upon the condition that the CB field of the SS directory entry is reset while the COL field is non-zero (decision 49a of FIG. 4), the page is once again marked as dirty. The significance of this subsequence is discussed below in connection with the castout procedure. The page write procedure ends in all cases with the page being written into the shared cache of the SS 16, and returning response to the issuing DBMS.

As thus far disclosed, the invention, in providing timestamps for entry into the SS directory 32, might be sufficient to establish a recovery boundary for the SS 16 simply by taking the minimum of the union of all system timestamps found in the list 45 and all of the page timestamps in the TS filed of the SS directory 32. However, as the pages are returned to the DAS from the SS 16, the recovery boundary would be pushed forward; otherwise, the recovery boundary would become very old and recovery from failure of SS16 could take enormous resources and time. As pages are castout to DAS, the page version of the DAS is recent enough that only log records reflecting modification of the page after the most recent cast out need be applied to recover the page to its latest state. That is, the recovery boundary for this page extends back only as far as the modification made to it after it was cast out. Recognizing this, the inventors have realized that the timestamp field for a page in the SS directory can be "pushed" (updated) in response to the castout process.

THE CASTOUT PROCESS

The castout process in the environmental context illustrated in FIG. 1 can be appreciated by reference to the cross-referenced U.S. Patent Application Ser. No. 627,315. For convenience, the process is explained briefly with reference to FIGS. 5 through 7.

Since the role of the SS 16 is to increase concurrency and availability, its management logic permits read and write access to pages which are being cast out. At the same time, a guarantee is given that casting the page out will not cause loss of a more current version of the page entered into the SS 16 during the castout process. Two commands are utilized for this purpose: read for castout and unlock castout lock.

The castout process employs a first command—read for cast out-issued by DBMS to the management logic 17. This command initiates castout processing for a page P. The parameter list sent to the management logic 17 with the command includes identification of the DBMS, identification of the page, and the buffer address in the DBMS to which the page is to be transferred from the SS 16. Upon receipt of the page, the DBMS writes the page to DAS. After the DAS I/O completes, the DBMS issues the unlock castout lock command. The parameter list for the unlock castout lock command identifies the DBMS and the page and is provided to the management logic 17 to inform that the page has been successfully written to DAS.

Figure 5:
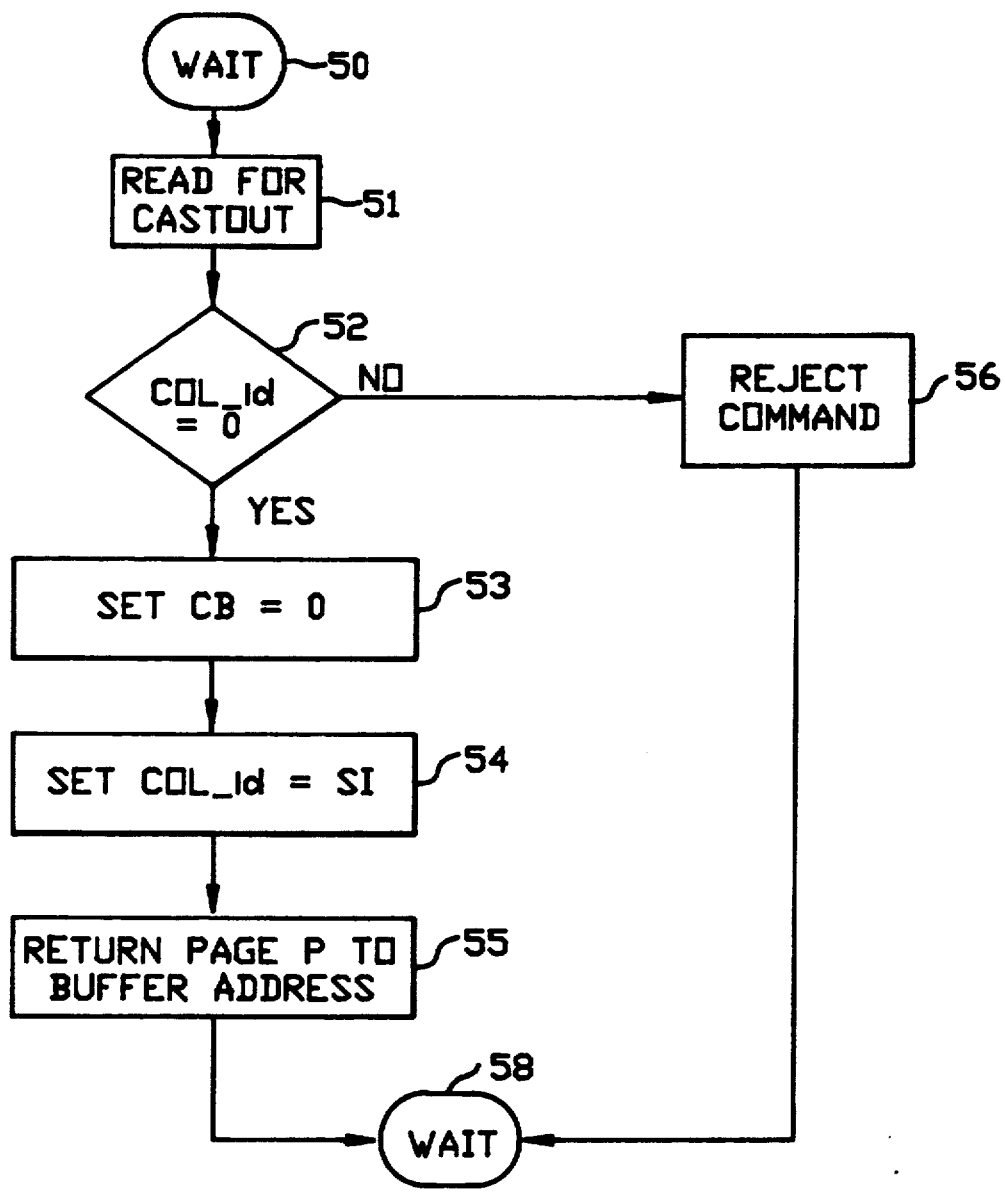
FIG. 5-7 are flow diagrams illustrating how structure sequence numbers are pushed forward in the shared store during a castout operation.

The processing of the read for cast out command is illustrated in FIG. 5. Initially, the management logic 17 is in the wait state 50 from which it transitions in response to receipt of a read for castout command from DBMS SI for page P. In response to receipt of the command, the management logic checks the COL field of the directory entry for page P. If the field is empty (preferably denoted by a value of 0), the management logic 17 takes a positive exit from the decision 52, sets the CB field in the directory entry for page P to 0 in step 53 and enters the identification (SI) of the requesting DBMS into the COL field of the entry in step 54. The management logic 17 then returns the copy of page P to the specified DBMS buffer address and enters the wait state at 58. At this point, the DBMS SI will begin an I/O process for writing the version of page P written to its buffer to DAS.

The negative exit from decision 52 provides for the possibility that another system is conducting a castout operation, in which case the COL field will be nonzero and the negative exit will be followed from the decision 52. In this case, the management logic 17 will reject the presented command in step 56 and return to the wait state at 58.

Figure 6:
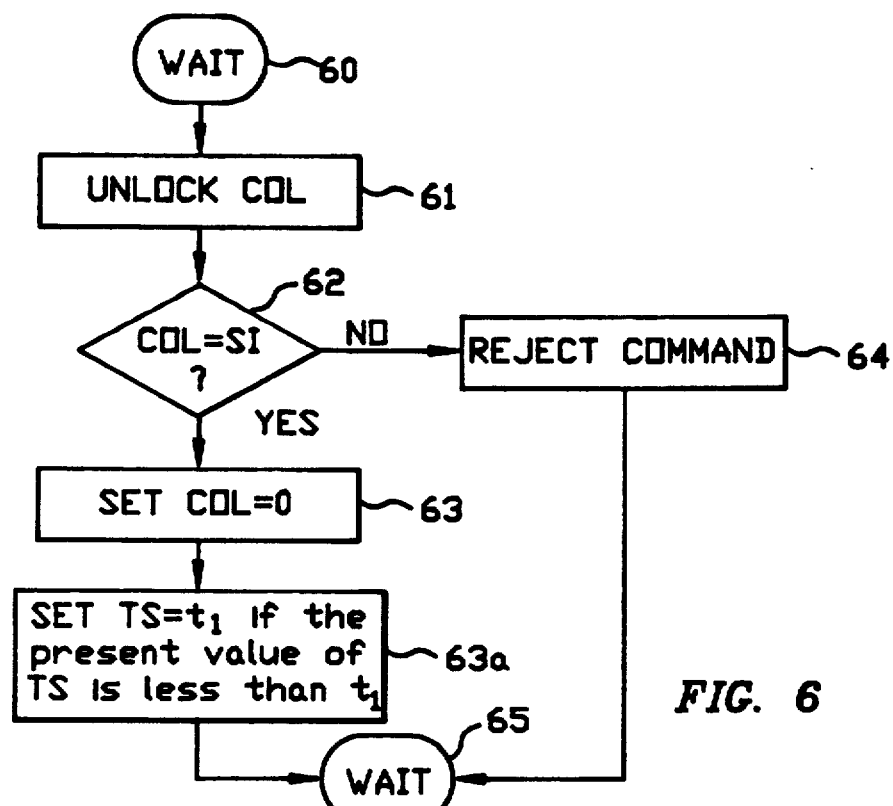

FIG. 6 illustrates the management logic processing for the unlock cast out lock command. Initially, the management logic 17 is in the wait state 60. Upon receiving the unlock cast out command in step 61 from the DBMS from whom the logic accepted the previous read for cast out command (step 62), the management logic compares the entry in the COL field of page P with the DBMS's ID (SI). Equality of the value signifies that the requesting system is the one which initiated the castout process with a read for castout command. If the values are equal, the positive exit is taken from decision 62, the COL field is set to 0 in step 63, and the management logic enters a wait state at 65. Admitting the possibility of software error in non-equality of the COL and system ID values, the negative exit is provided from decision 62, leading to rejection of the command in step 64 in re-entry of the wait state 65.

Figure 7:
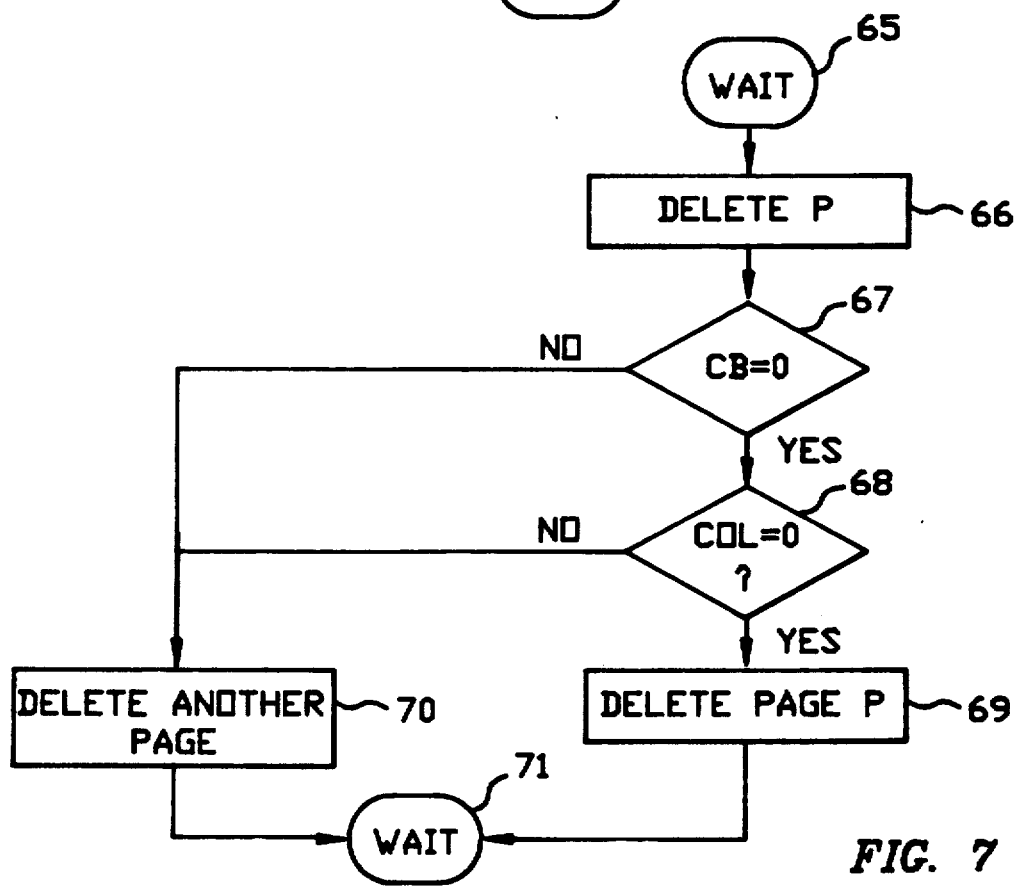

FIG. 7 shows the processing for deletion of a page which has been previously castout by use of the commands represented in FIGS. 5 and 6. Relatedly, "deletion" means removal of a directory entry and appropriation of the cache space pointed to by the entry. Necessarily, the delete process for a dirty page depends upon completion of a read for cast out/unlock castout lock sequence, following which the cast out page P would be deleted.

Figure 8:
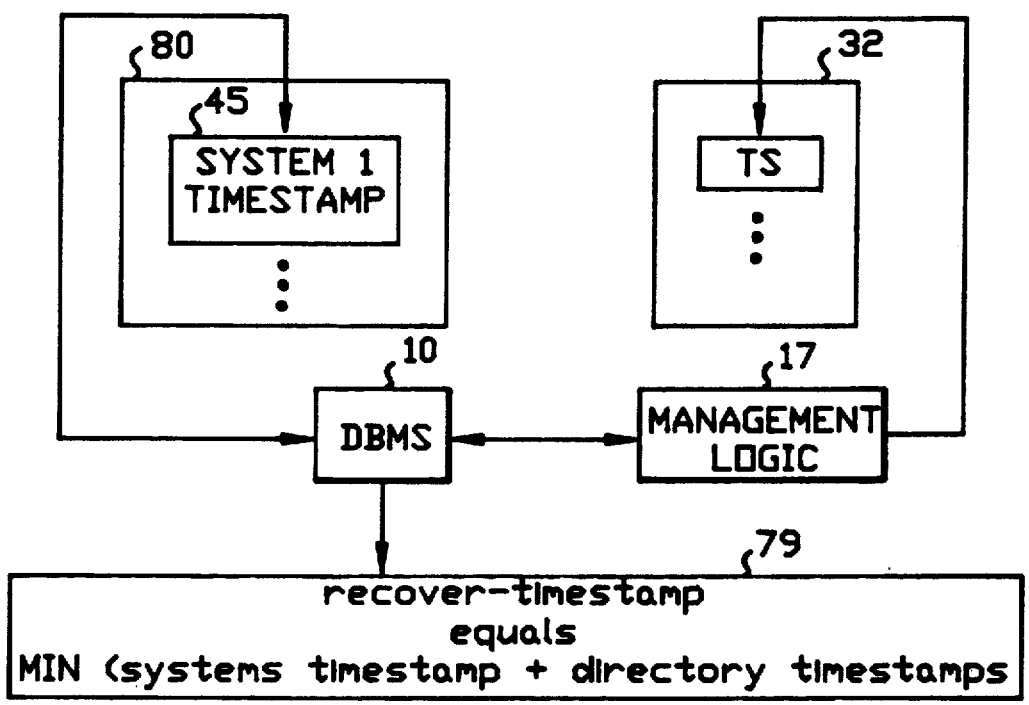
FIG. 8 illustrates the derivation of a shared store recovery sequence number from system and structure sequence numbers.

FIG. 8 illustrates how the castout process provides against deletion of a page which has been updated by another DBMS during the castout process.

In FIG. 7, a delete process is invoked internally in the management logic 17 to delete page P from the shared cache 30 when a directory entry has to be created and no free entry is available. This is step 66. The delete processing first inspects the CB field of the directory entry for the page P and then the COL field of the entry. These are decisions 67 and 68. In decision 67, if the change bit has been set, the inference drawn is that the version of page P in the shared cache and the version in the DAS are inconsistent, in which case deletion will have to await a castout process to write the shared cache version to DAS. In this case, the negative exit is taken from the decision 67 and another page is selected for deletion. In decision 68, it is possible that a castout process has begun but has not yet completed. In this case, the COL field would be nonzero and the delete process would terminate by following the negative exit from 68. The negative exits from decision 67 and 68 join in step 70 in which another page is selected for deletion. Assuming a positive exit from each of the decisions, the conditions of consistency between shared cache and DAS versions and completion of a castout process would be met and the directory entry for the page P would be deleted in step 69 from the directory 32. At this time, the appropriate cache management policy would be invoked to steal the cache space allocated to the page P.

Table 4 illustrates how the directory timestamp for a page is "pushed" during the castout process. In step 401, the DBMS which is preparing to issue the read for castout command sets the value of a parameter $t_1$ to the minimum of the system timestamps maintained in the list 45. This value ensures that all updates made to locally-buffered pages which have not yet been transferred to the SS 16 are included in a timestamp which establishes a boundary early enough to capture all of the updates. This value is maintained at the DBMS when it issues the read for castout command and while it writes the page to DAS. In step 404 of Table 4, the parameter $t_1$ is included in the parameter list sent to the management logic 17 with the unlock castout lock command. During unlock COL processing, the management logic 17 indexes in the SS directory 32 to the entry for the identified page, sets its COL field to 0 and sets the timestamp field TS to the value passed $t_1$ if the current value for TS is lower than $t_1$. Otherwise, the value for TS is unchanged. This is illustrated as step 63a in the unlock castout process of FIG. 6.

A recovery boundary for failure of the SS 16 is ascertained according to the procedure laid out in Table 5. In Table 5, the pseudo-code for computing this value (called "recover-timestamp") is shown in a preferred embodiment wherein one DBMS of the plurality of DMBS's is assigned the responsibility of calculating the value of $t_1$ which is the minimum of system timestamps in the list 45. Management logic 17 scans its directory 32 to provide values of the TS fields of all entries whose CB fields are set to COL values is non-zero (i.e., pages are changed). Management logic 17 also scans its directory 32 to determine the minimum value of the set of values included in the TS fields of all entries whose CB fields are set. This value is assigned to management logic parameter $t_2$. With the two values $t_1$ and $t_2$, the recover timestamp is ascertained in step 503 by taking the minimum of the two values.

FIG. 8 shows a preferred embodiment for implementation of Table 5. In FIG. 8, the logic for determining $t_1$ and $t_2$ resides in the DBMS executing in the processor 10. The management logic 17 conducts a scan of its directory 32 and passes the TS values to the DBMS for the appropriate calculations. Thus, the current value of the recover-timestamp parameter 79 is illustrated in FIG. 8 as being under the control of the DBMS. This arrangement contemplates that the DBMS would issue to the management logic a read directory command in order to compute the recover timestamp. In response, the management logic passes the appropriate TS values to the DSMS. This command may be invoked multiple times because it may not be possible for the management logic 17 to scan the entire SS directory 32 in a short enough period. In this case, a restart-token (TKN) would be returned to the DBMS where the scan is to resume. In this regard, if the restart token is 0, the management logic 17 starts reading directory entries with set change bits from the beginning; otherwise, it starts from the restart token value. It returns as many values of the TS as would fit into a buffer under the control of the DBMS whose size would be specified in the parameter list of the read-directory command. It would also be possible for the management logic to compute $t_2$ and return only one value. When a value is returned by the management logic, a restart token would also be returned if the directory scan were not complete; otherwise, the return from the management logic 17 would indicate end-of-directory. The block 79 in FIG. 8 implies that the DBMS would store the recover-timestamp in checkpoint file 22 shown in FIG. 1.

Recovery of data from failure of SS 16 is illustrated in Table 6, which assumes the existence of an appropriate recovery routine, such as the one described in cross-referenced U.S. patent application Ser. No. 406,186. In this regard, Table 6 presents pseudo-code for determining data sets which need to perform data recovery due to failure of the SS 16.

In step 601 of Table 6, the transaction logs of all of the DBMS's sharing a data set are merged in timestamp order. The data sets are identified, for example, by scanning the merged log. Starting from the recover timestamp, all data sets for which log records are encountered are marked "recover-pending" in step 602. The "recover-pending" signifies that the data is unavailable. In step 603, the data sets identified in step 602 are recovered using the merged log and the DAS copy. Recovery may be done in parallel for different data sets with a log record from the merged log being applied only if the timestamp in the DAS version of the page is less than that in the log record. The recovered pages are written back to DAS. As each data set is recovered, the recover-pending indicator is removed and the data set is made available.

During recovery of the SS 16, the inventors contemplate that the DBMS's will continue to operate, with new transactions being denied permission to allocate the databases marked "recover-pending". Transactions which are currently executing when notice of failure of SS 16 is received fall into two categories. First, the transaction may not have modified any page of the recover-pending databases. For these transactions, further requests for the SS 16 are denied since it cannot be accessed. The second category involves transactions which have modified pages of data sets which are marked recover-pending. These transactions would be aborted, with the DBMS writing compensation log records to account for pages which the transaction had modified in its forward progress. In order to permit the writing of all compensation log records into log files, the recovery of the SS 16 would be started only after all incomplete transactions commit or abort. The highest timestamp when these log records are written would be noted to ensure that these log records (which were written after the store failed) are included in the recovery process.

ADVANTAGES OF RECOVERY FROM DAS

High availability of data is an important user requirement. Even though the SS 16 would typically be a reliable device, a DBMS has to provide recovery of data when the SS 16 fails. For highly available data, a user may choose to duplex changed data. But this has the extra cost of another SS 16, and mainline overhead of another write. The approach of recovering data from DAS does not require these provisions. Also, if both copies of the shared store. fail, the described invention still permits recovery from DAS. Further, in light of the fact that the shared store is a reliable device, a user may choose to give up some availability in an extremely rare situation for extra mainline cost of duplexing.

Recovery from DAS is more efficient than recovery from an image copy of the databases. This is because the DAS version of data is more current than that of an image copy, implying the following advantages:

only a subset of any data set marked recovery-pending needs to be recovered, the subset consisting only of changed pages which were in the SS 16 when it failed. This reduces I/O activity with DAS;

log volume to scan for recovery is much smaller than that for recovery from the image copy. If the castout process is reasonably frequent, an archive log would not be needed; and the merger of logs would be on a smaller amount of log data compared to recovery from an image copy.

Obviously, while the invention has been particularly shown and described with reference to the preferred embodiment described above, it will be understood by those skilled in the art that many changes in form and details may be made therein without departing from the spirit and scope of the invention.

TABLE 1

Pseudo-code to compute system-timestamp for each DBMS member in the data sharing complex

| | | |
|---|---|---|
| 101 | Initialize the new-system-timestamp to the DMBS timestamp of the begin__checkpoint log record | |
| | /= begin__checkpoint log record was | =/ |
| | /= written before this process is | =/ |
| | /= triggered | =/ |
| 102 | DO LOOP for each DIRTY page in the buffer pool | |
| | /= DBMS maintains a list of dirty pages | =/ |
| | /= that have not yet been externalized to | =/ |
| | /= the SS | =/ |
| 103 | If the timestamp of the DIRTY page is less than the new-system-timestamp THEN | |
| | /= for each dirty page, its timestamp | =/ |
| | /= is the timestamp of the first update | =/ |
| | /= log record which caused the page | =/ |
| | /= state to change from CLEAN to DIRTY | =/ |
| 104 | new-system-timestamp = DIRTY page timestamp. | |
| | /= need to update the system-timestamp | =/ |
| | /= to cover log changes for this DIRTY | =/ |
| | /= page | =/ |
| 105 | ELSE. | |
| | /= do nothing | =/ |
| 106 | END. | |
| 107 | System-timestamp = new-system-timestamp | |
| | /= now the current | =/ |
| | /= system-timestamp is moved forward with | =/ |
| | /= the new-system-timestamp | =/ |

TABLE 2

Pseudo-code for setting the page-timestamp value in DBMS mainline during a page update operation.

| | | |
|---|---|---|
| 201 | Acquire an intra-system page latch to ensure updates on page P are performed serially within a DBMS. | |
| 202 | Acquire an inter-system page lock in exclusive mode to ensure only one DBMS is ready to modify page P. | |
| 203 | Buffer or ensure the currently buffered page P is a valid page. | |
| | /= if not valid, refresh page P from | =/ |
| | /= SS. If not in SS, refresh it from DAS | =/ |
| 204 | Update the page and log the page update for recovery use with timestamp in the log record. | |
| | /= Each DBMS log record will have | =/ |
| | /= an associated timestamp value. | =/ |
| 205 | IF page P was in a CLEAN state THEN | |
| | /= P is ready to be converted from CLEAN | =/ |
| | /= to DIRTY state | =/ |
| 206 | page-timestamp ($t_0$) = timestamp of the log record for this update operation. | |
| 207 | ELSE. | |
| | /= do nothing because timestamp value | =/ |
| | /= was already set for this page | =/ |
| 208 | Release the intra-system page latch. | |
| 209 | Release the inter-system page lock after the page becomes clean. | |

TABLE 3

Pseudocode for manipulating the page-timestamp in the SS during a page write to SS (P, CB=1, Buffer-address, TS=T₀)

```
301 IF the SS directory entry for page P does
     not exist THEN
     /= page P directory entry was aged            =/
     /= out from the SS                            =/
302 DO.
303 Assign and initialize a directory entry for P.
304 Set CB = 1.
     /= Mark P as a Dirty page in the SS           =/
305 Set TS = t₀
     /= Accept the passing page-timestamp,         =/
306 Accept data provided with the Write command.
307 END.
308 ELSE
309 IF the directory entry for P exists and it is
     unmodified THEN
     /= i.e., CB = 0 and COL = 0                   =/
310 DO
311 Set CB - 1
     /= Mark P as a Dirty page                     =/
312 Set TS = t₀
     /= Accept the passed page-timestamp           =/
313 Accept data provided with the Write command.
314 END
315 ELSE
316 /= the directory entry for P exists and it was =/
     /= already dirty                              =/
     /= i.e., CB = 1 or COL=0                      =/
317 DO
     /= cannot accept t₀ because updates have been =/
     /= made prior to t₀ which have not yet been   =/
     /= externalized to DAS from SS. A non-zero COL =/
     /= field means that the page castout is in    =/
     /= progress and not yet completed.            =/
318 IF CB = 0 THEN
     /= COL must be non-zero which indicates page  =/
     /= castout is in progress                     =/
319 Set CB = 1
     /= Mark page P dirty again                    =/
320 ELSE
321 Accept data provided with the Write command
322 END
```

TABLE 4

Pseudo-code for manipulating the page-timestamp in the SS for page P during a page castout operation.

```
401 DBMS sets t1 = MIN (system-timestamps for all
     DBMS's in the data sharing complex).
     /= For each DBMS, the system-timestamp is     =/
     /= maintained as in Table 1. Since inter/intra =/
     /= system locking is not acquired during a page =/
     /= castout operation, t1 is used to cover all =/
     /= updates that have not yet been externalized =/
     /= to the SS                                  =/
402 Notify SS to perform Read-For-Castout for page P.
     /= Set CB = 0, COL = 0 and transfer data from =/
     /= SS to castout buffer                       =/
403 DBMS write page P to disk from the castout buffer.
404 Notify SS to perform Unlock-Castout-Lock and
     pass t1 as the new page-timestamp.
     /= Set COL = 0 and set TS = t1 if the value in =/
     /= the directory entry is lower than t1       =/
```

TABLE 5

Pseudo-code for computing the recover-timestamp of the SS.

```
501 DBMS sets t1 = MIN (system-timestamps for all
     DBMS's in the data sharing complex).
     /= For each DBMS, the system-timestamp is     =/
     /= maintained as in Table 1.                  =/
502 DBMS issues Read-Directory SS command to get
     the minimum timestamp across all changed pages in
     the SS and stores this timestamp in t2.
     /= DBMS may issue this command one or more times =/
     /= to compute the t2 value                    =/
```

TABLE 5-continued

Pseudo-code for computing the recover-timestamp of the SS.

```
503 Set recover-timestamp = MIN (t1,t2).
```

TABLE 6

Pseudo-code to set logical recover pending for datasets due to SS failure.

```
600 Wait for transactions using shared store to complete
     and then merge logs of all DBMS's sharing the
     datasets
     /= merge is done in timestamp order           =/
601 Scan merge log(s) of all sharing DEMS systems
     starting from the recover-timestamp.
602 Set "Recover Pending" for datasets that had database
     logging activities against the shared store.
     /= pending, means that the dataset is         =/
     /= unavailable until it is                    =/
     /= recovered.                                 =/
603 Recover each dataset and reset "Recover pending"
     status
```

We claim:

1. In a multi-computer datasharing system including a shared electronic store (SS), a low-speed direct access data storage facility (DAS), a plurality of independently-executing database systems connected to the SS and to the DAS, and a database including data in the DAS, wherein each database system includes:

transaction-based means for obtaining data structures from the DAS, modifying the data structures locally and placing the data structures in the SS for access by other database systems;

a log and transaction means for entering into the log a sequence of records corresponding to modifications made to data structures; and log records from different database systems can be sequenced;

a machine-executable method for maintaining a transaction log boundary for recovery of the database from failure of the SS, the method including the steps of:

for each database system, ascertaining a system sequence value which is substantially equivalent to the log sequence location of a log record recording the earliest modification to a data structure at the database system which is not included in any data structure in the SS;

at each database system, for each data structure modified at the database system, providing a sequence value which is less or equal to a log sequence location of the log record recording the earliest modification to the data structure;

for each data structure in the SS, based upon sequence values provided by the database systems, ascertaining a structure sequence value corresponding to a log sequence location of a log record of the earliest modification of the data structure occurring after the data structure was obtained from the DAS; and ascertaining from the system and data structure sequence values a recovery boundary corresponding to the earliest of the system and structure values.

2. The method of claim 1, wherein the system sequence values, the structure sequence values, and the recovery boundary are log record timestamps.

3. In a multi-computer data sharing system including a shared, high-speed electronic store (SS), a low-speed direct access data storage facility (DAS), a plurality of computer-implemented database systems connected to the SS and to the DAS, and a database including data structures stored in the DAS, wherein each database system includes transaction-based means for:
  obtaining data structures from the DAS;
  locally storing data structures for immediate access; altering locally-stored data structures; and
  storing data structures in and from and moving data structures from the SS;

a method for recovery of the database from failure of the SS, the method including the steps of:
  maintaining for each database system a transaction log including a sequence of log records, each log record including a unique sequence value denoting its place in the sequence;
  maintaining at each database system a system sequence value which is substantially equal to the sequence value of a log record of the earliest modification made by the database system to locally-stored data structures which is not included in any data structure stored in the SS;
  maintaining for each data structure modified and then stored in the SS a structure sequence value which corresponds to a log record of the earliest modification made to the data structure by a database system after the data structure was obtained from the DAS;
  periodically determining a recovery sequence value by taking from the system sequence values and the structure sequence values a sequence value which corresponds to a log record of the earliest modification made to any data structure which is locally stored at a database system or in the SS; and
  in the event of a failure of the SS:
    for the union of all the transaction logs, identifying data structures in the DAS for which corresponding log records exist with sequence values following the recovery sequence value; and
    applying to the identified data structures the modifications in the log records with sequence values following the recovery sequence value.

4. The method of claim 3, wherein the step of maintaining a system sequence value includes:
  for each locally-stored data structure which is modified at the database system, listing at the database system the sequence value of the log record corresponding to the earliest modification made to the data structure at the database after locally storing the data structure; and
  periodically selecting from the listed sequence values the sequence value occurring earliest in the sequence of log records of the database system's transaction log.

5. The method of claim 4, wherein the multi-computer system further includes a SS directory with entries for data structures stored in the SS, each entry having a field for indicating modification (change field) and a sequence field for storing a structure sequence value, the step of maintaining a structure sequence value including:
  after modification of a data structure at a database system providing the data structure to the SS for storage together with the listed sequence value for the data structure;
  upon provision of the data structure for storage in the SS, inspecting the SS directory entry for the data structure;
  if the change field indicates that no prior modification has been made to the data structure:
    setting the change field and entering the listed sequence value into the sequence field as a structure sequence value for the data structure; and
    storing the data structure;
  otherwise, storing the data structure without changing the sequence field.

6. The method of claim 5, wherein the multi-computer system further includes means for casting out a data structure from the SS to the DAS by a castout procedure which includes:
  (1) obtaining for a database system a cast out lock (COL) on the data structure which permits modification of the data structure during the castout procedure;
  (2) reading the data structure from SS to the database system;
  (3) writing the data structure from the database system to DAS; and
  (4) releasing the COL; the method further including the steps of:
  (1a) during the castout procedure, ascertaining the earliest system sequence value ($t_1$);
  (4a) at step (4) of the castout procedure, entering $t_1$ into the value field of the SS directory entry for the data structure if it is greater than the existing structure sequence value for the data structure; otherwise,
  (1) obtaining for a database system a cast out lock (COL) on the data structure which permits modification of the data structure during the castout procedure;
  (2) reading the data structure from SS to the database system;
  (3) writing the data structure from the database system to DAS; and
  (4) releasing the COL; the method further including the steps of:
  (1a) during the castout procedure, ascertaining the earliest system sequence value ($t_1$);
  (4a) at step (4) of the castout procedure, entering $t_1$ into the value field of the SS directory entry for the data structure if it is greater than the existing structure sequence value for the data structure.

7. The method of claim 4, wherein the step of maintaining a transaction log includes periodically providing checkpoint records in the sequence of log records, the step of periodically selecting being performed in response to providing a checkpoint record.

8. The method of claim 4, wherein the step of listing includes:
  maintaining at the database system a list of data structures which have been obtained from the DAS, locally stored and modified at the database system, and not stored in the SS since being modified;
  each entry of the list including a sequence value field; and
  placing in the sequence value field for each entry of the list a sequence value of the log record corresponding to the earliest modification made to a corresponding data structure at the database after locally storing the data structure.

9. The method of claim 4, wherein the step of listing includes:
  maintaining a list of data structures locally stored at the database system which are dirty with respect to the SS; and
  for each listed data structure, maintaining in the list a sequence value of the log record corresponding to the earliest modification made to the data structure after storing it at the database system.

10. The method of claim 3, wherein the system further includes means for providing a monotonically changing sequence of timestamps, the step of maintaining a transaction log including applying a timestamp to a log record as a sequence value.

11. The method of claim 3, further including the step of permitting a database system to access in the DAS any data structure not having a corresponding log record with a sequence value following the recovery sequence value.

* * * * *

UNITED STATES PATENT AND TRADEMARK OFFICE
CERTIFICATE OF CORRECTION

PATENT NO. : 5,280,611
DATED : January 18, 1994
INVENTOR(S) : Mohan et al

It is certified that error appears in the above-indentified patent and that said Letters Patent is hereby corrected as shown below:

Col. 16, line 36, please insert --wherein,-- immediately preceding "log records"; and
line 49, please insert --than--, preceding "or" and following "less".

Col. 17, line 7, please delete "from and".

Col. 18, line 27, please add --leaving the value field unchanged.--; and please delete lines 28-43.

Signed and Sealed this

Eleventh Day of April, 1995

Attest:

BRUCE LEHMAN

Attesting Officer        Commissioner of Patents and Trademarks